June 21, 1960 F. R. GOOD 2,941,823
W-BAND COUPLING FOR FLANGED PIPE
Filed Dec. 21, 1954

*INVENTOR.*
FRANCIS R. GOOD
BY William R. Lane
ATTORNEY

2,941,823
W-BAND COUPLING FOR FLANGED PIPE

Francis R. Good, Fullerton, Calif., assignor to North American Aviation, Inc.

Filed Dec. 21, 1954, Ser. No. 476,694

3 Claims. (Cl. 285—408)

This invention relates to a band coupling and, more particularly, to a coupling adapted to encircle and hold the flared or flanged ends of a pair of tubular or cylindrical members in axial and abutting engagement with each other.

V-band couplings are used successfully in aircraft in only a limited number of applications. They consist generally of a curved V-shaped inner retainer band which is spot-welded to an outer circular, flat band. The outer band is fitted with a T-bolt which serves to tighten said outer band and the retainer about the tubing flanges. The retainer is shaped to fit over the flanges in contact and coextensive with their axially and radially directed non-abutting surfaces so as to draw the abutting surfaces together axially when the T-bolt is tightened.

In many applications, especially in jet engine powered airplanes and guided missiles, where the temperatures are generally higher than in older types of aircraft, the conventional V-band couplings tend to allow leakage through the tube flanges due to the fact that the sides or legs of the retainer are caused to creep away from the flanges by the greater heat present.

The present invention overcomes the problem of leakages due to retainer creep in high temperature installations by providing a generally annular, closed sectioned retainer comprised of an inwardly opening channel with diverging sidewalls, each of which terminates in a radially and axially divergent flange, forming a band of W-shaped cross-section, and by having the ends of the legs or flanges of the W secured against joggles or notches in the outer band. The joggled type of band has the cross-section of an inwardly opening channel having the joggled surfaces extending radially inward and then terminating in outwardly axial flanges. The notched band has a flat cross-section showing the notches to have been cut adjacent to the two internal edges. The notches are coextensive and parallel to the edges. As can be readily seen, this new configuration has a reinforced retainer and a means to prevent creeping of the retainer in the axial directions. This improvement over the V-band coupling is accomplished by a minimum of additional weight, material and expense. When the outer band is drawn together in tension around the inner retainer band, the W-legs, being locked under the outer band by the joggles or notches, add 100 percent more holding strength against the tubing flanges than effected by a V-band coupling.

Therefore, an object of this invention is to provide an improved coupling for holding the flanges or flared ends of two pieces of tubing in axial abutting relationship at high temperatures.

A principal object of this invention is to provide a tubing coupling with a retainer that will not creep away from the tubing flanges at high temperatures.

Another object of this invention is to provide a band coupling capable of exerting 100 percent more force against tubing flanges than a V-band type of coupling.

Other objects of invention will become apparent from the following description taken in connection with the accompanying drawings, in which Fig. 1 is a side view of the W-band coupling;

Figure 4:
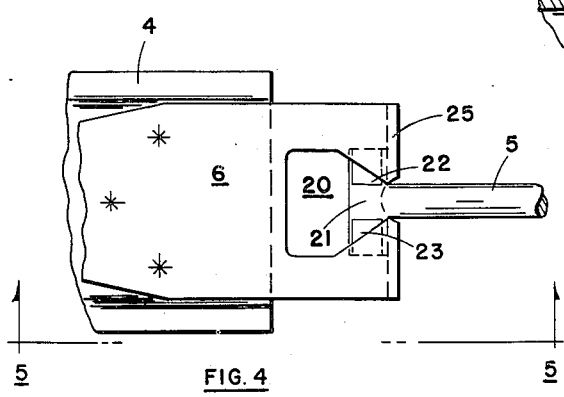
Fig. 4 is a plan view of a quick connecting T-bolt in the band strap.
Figure 5:
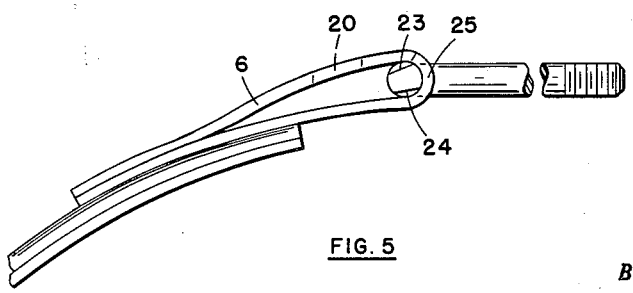

And Fig. 5 is a side view of the quick connecting T-bolt in the band strap taken along the lines 5—5 of Fig. 4.

Figure 1:
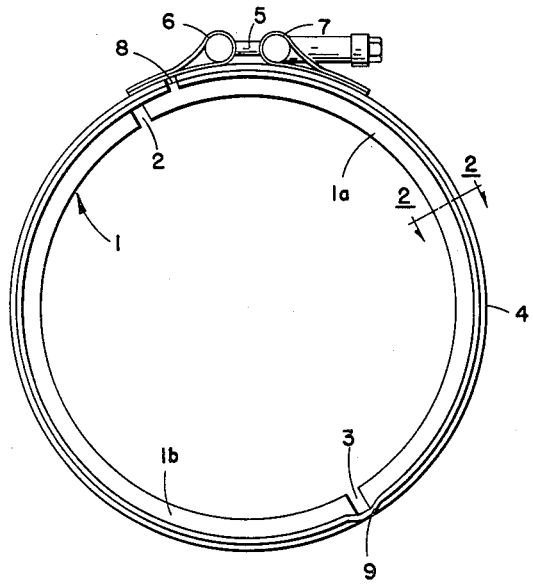

Referring to Fig. 1, showing the side configuration of the coupling, the W-shaped retainer 1 is in two segments 1a and 1b. In a lighter constructed coupling the retainer may be in one piece and in one heavier than shown, four segments may be desirable. Retainer separation space 2 is the opening through which the tubing is slipped when the coupling is spread open. Retainer separation space 3 is required to make the coupling flexible for opening. Joggled band 4 may be spot-welded to the central portion of the retainer segments 1a and 1b at spaced intervals for easier handling. Band 4 is drawn together to close the coupling by means of T-bolt 5 which is secured in straps 6 and 7 which are spot-welded to band 4. Band 4, which opens at space 8, has a joggle adjacent to each edge, shown more clearly in Fig. 2, and a flat, non-joggled area 9 which is coextensive with retainer separation space 3. Non-joggled area 9 is desirable in band 4 to make it flexible for opening.

Figure 2:
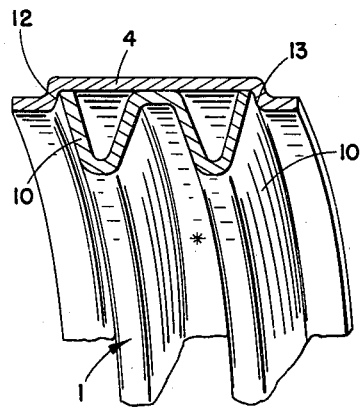
Fig. 2 is a partial perspective view of the joggled band and retainer taken on line 2—2 of Fig. 1.

Fig. 2 shows the legs 10 of W-shaped retainer 1 abutting joggles 12 and 13 of band 4. It is this relationship of the legs held against the joggles which prevents the retainer from creeping away from the tubing flanges and thereby prevents leakage between the flanges.

Figure 3:
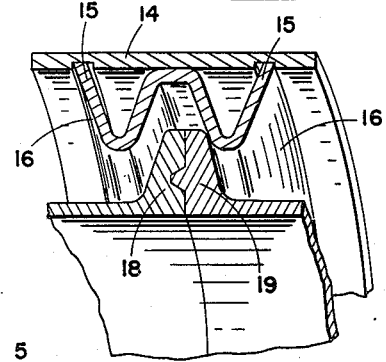
Fig. 3 is a cross-sectional view of a notched band and retainer showing flanged tubing held in engagement by the coupling.

In Fig. 3 an alternate form of band is shown. Instead of joggles, notches 15 in band 14 are used to hold retainer legs 16. Also, in cross-section is shown a typical pair of tubing flanges 18 and 19 having convergent outer surfaces and being held in engagement by the W-band coupling. A gasket may or may not be inserted between the flanges, depending upon their construction.

Figs. 4 and 5 illustrate a quick coupling arrangement where T-bolt 5 is held in strap 6 which is spot-welded to band 4. Removal of the T-bolt from the strap is necessary to open the coupling for slipping on and off tubing flanges. T-bolt 5 may be slipped out of strap 6 through opening 20. In a preferred embodiment, bar 21 of T-bolt 5 is cut flat at 22 and 23 and at their undersides as shown at 24 to make an easier fit into loop 25 of strap 6.

It will be seen that the invention described above provides a substantially improved band coupling which is particularly well adapted for use in high temperature installations, and that this necessary improvement has been with a minimum of weight and material.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A coupling comprising a curved outer band having a circumferentially extending notch adjacent to each edge on its inner surface, the walls of the notches closest to each edge forming two radially inwardly extending walls facing each other and being spaced apart a predetermined fixed distance, a W-shaped inner band curved coextensively with said outer band, the entire periphery of the end portions of the legs of said inner band being in contact with said notches and said radially inward extending walls, whereby said notches restrain the spreading of said legs, means to secure said inner band to said outer band, and means to draw the end portions of said outer band and inner band together.

2. A coupling comprising a curved inner band having a W-cross-sectional shape, the outer legs of said W-shape each terminating in a radially outwardly facing free edge, said free edges being spaced apart a predetermined distance, a curved outer band encircling said inner band, said outer band having two substantially radially outwardly extending walls facing each other, said walls each being at the edge of a re-entrant portion on said tension band, said walls being spaced apart a predetermined distance equal to the predetermined distance between said free edges of the inner band, each of said free edges seating within a re-entrant portion, said radially extending walls engaging the entire length of said free edges to restrain any spreading of the legs of the inner band, said inner and outer bands each having at least two end portions facing each other in peripherally spaced relationship, and means to draw the end portions of said outer ring together.

3. A coupling for joining two abutting hollow cylinders provided with flanges having outer surfaces which are radially convergent, comprising a generally annular band including a first and a second spaced curved band section comprised of an inwardly opening channel with diverging side walls, each side wall terminating in a radially and axially divergent flange which terminates in an annular free edge, and a tension band surrounding said annular band, said tension band having a first and a second edge cylindrical portion of predetermined radius, said tension band having a re-entrant portion between said edge cylindrical portions of a radius which is larger than said predetermined radius of said edge cylindrical portions, a wall extending substantially radially outwardly from each respective edge cylindrical portion to the re-entrant portion, said walls facing each other a predetermined fixed distance apart, said re-entrant portion and said walls on said tension band engaging the entire periphery of said free edges and preventing said flanges from spreading.

References Cited in the file of this patent

UNITED STATES PATENTS

| | | |
|---|---|---|
| 796,356 | Recht | Aug. 1, 1905 |
| 821,538 | Price | May 22, 1906 |
| 2,424,436 | Crater | July 22, 1947 |
| 2,675,253 | Stade | Apr. 13, 1954 |
| 2,756,079 | Herman | July 24, 1956 |

FOREIGN PATENTS

| | | |
|---|---|---|
| 126,655 | Great Britain | May 22, 1919 |